June 6, 1939.　　　　　G. EATON　　　　2,161,287
AUTOMOTIVE DEVICE
Filed June 1, 1936　　　2 Sheets-Sheet 1
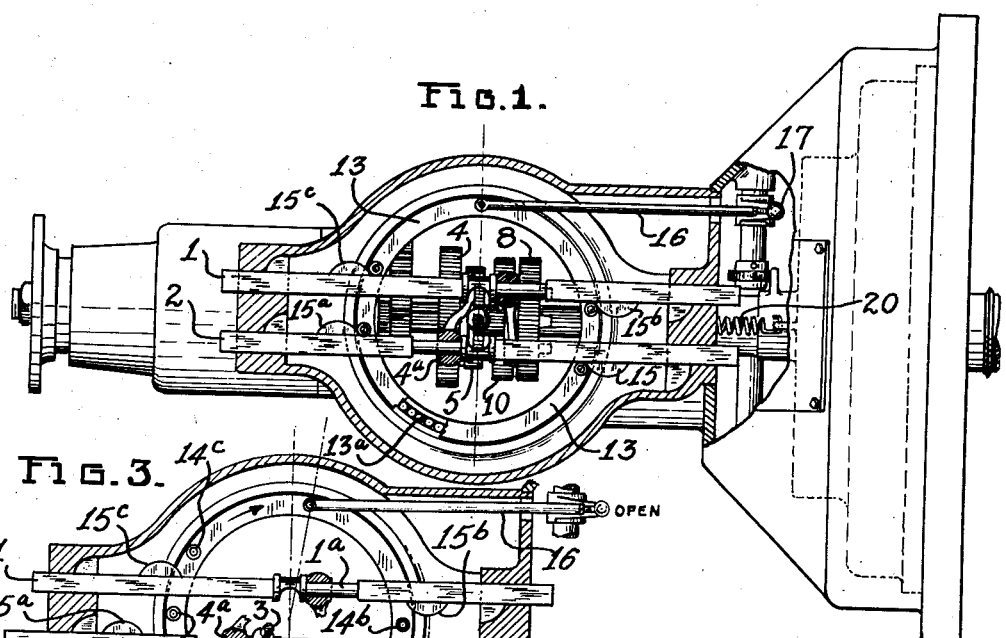
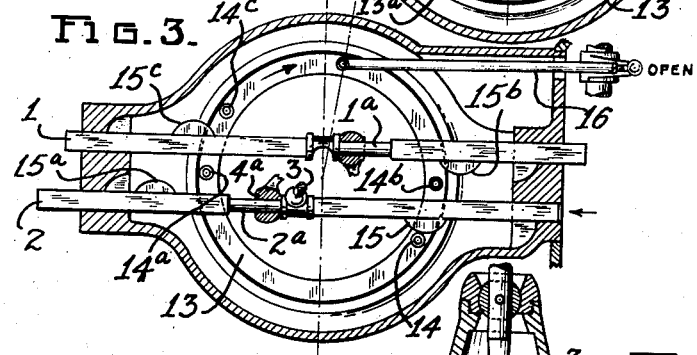
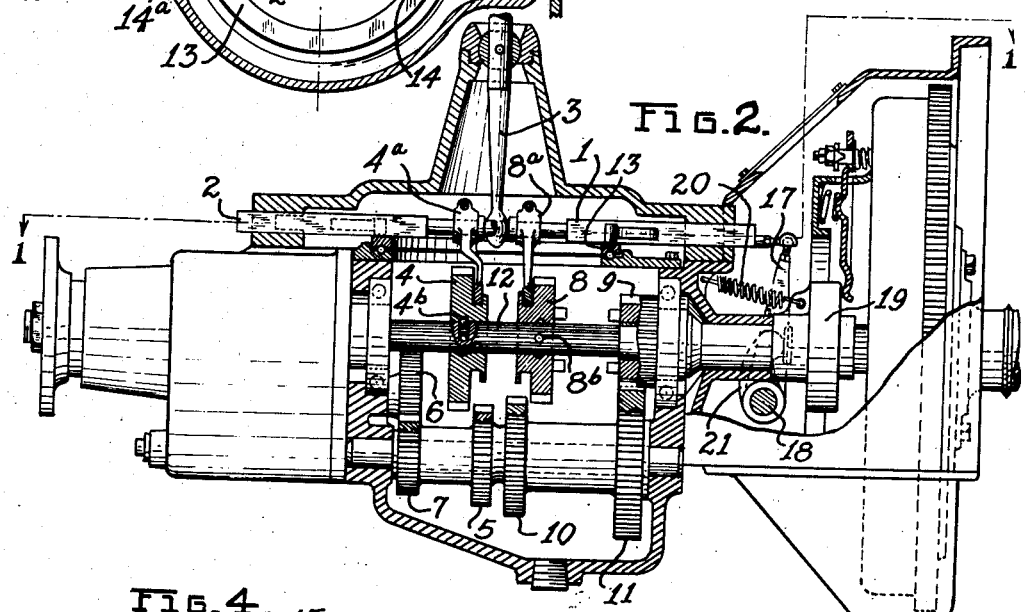
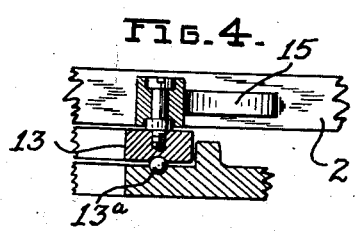
INVENTOR.
GEORGE EATON.
BY
*Milburn and Milburn*
ATTORNEYS.

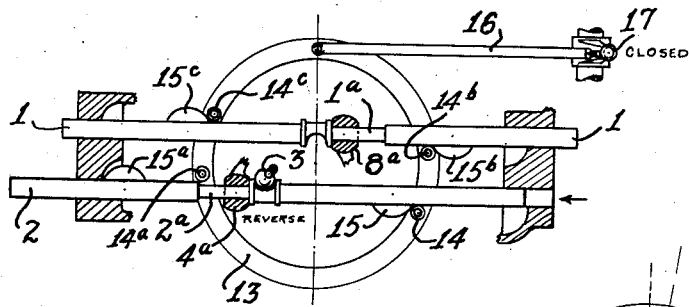
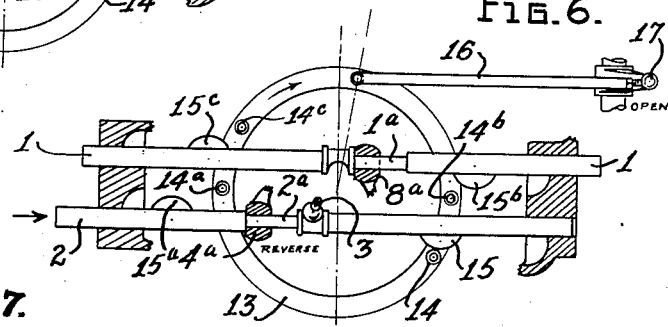
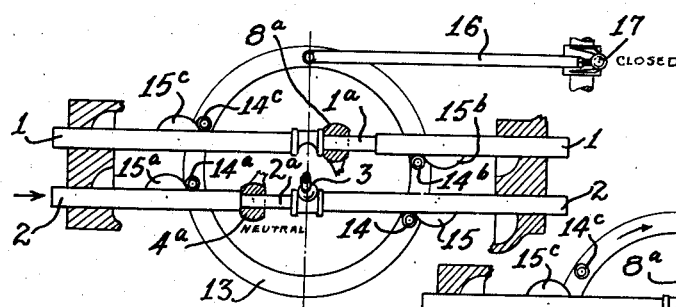
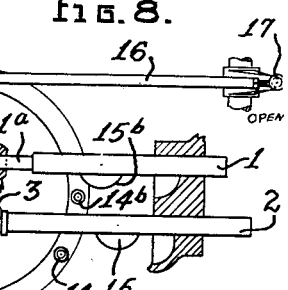
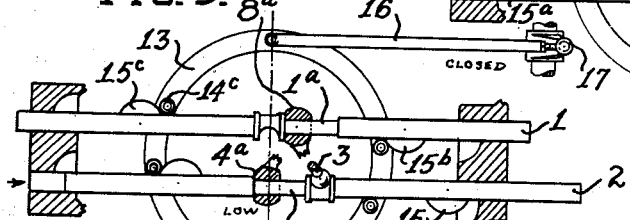
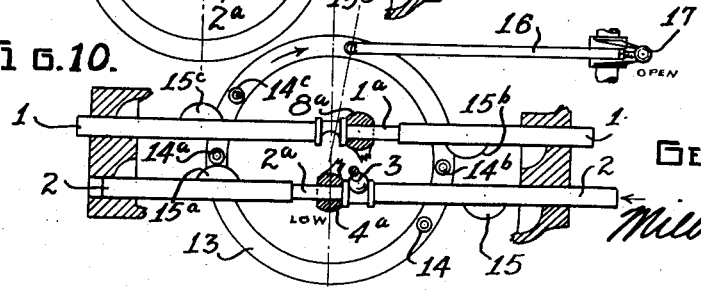
INVENTOR.
GEORGE EATON.
ATTORNEYS.

Patented June 6, 1939

2,161,287

UNITED STATES PATENT OFFICE 2,161,287

AUTOMOTIVE DEVICE

George Eaton, Cleveland, Ohio

Application June 1, 1936, Serial No. 82,986

11 Claims. (Cl. 192—3.5)

This invention relates to the general class of automotive devices.

The conventional type of automobile is provided with the familiar transmission by which the gear ratio may be varied and also with the familiar clutch which is disengaged preparatory to shifting the gears in the transmission. The transmission has a gear shift lever and the clutch has a foot pedal for manipulating the same. Thus, as is well known, the shifting of the gears in the conventional type of automobile, always entails the depression of the clutch pedal, with the consequent tiring effect upon the driver, to say nothing of the annoyance of having to perform this operation and to give the attention required in connection therewith.

The object of the present invention is to devise an operative means of connection between the gear shift means and the clutch whereby the clutch pedal can be eliminated and the clutch manipulated in connection with the shifting of the gears in the transmission.

A further object is to devise such a combination in which the parts are so constructed and arranged that there will be the properly timed relation between the manipulation of the clutch and the shifting of the gears.

Another object is to devise such a combined structure that is of a comparatively simple nature and that does not require any radical modification of the conventional type of automotive construction to which my invention is applied.

Other objects will appear from the following description and claims when considered together with the accompanying drawings.

Fig. 1 is a view taken on line 1—1 of Fig. 2 and illustrates the device in neutral position;

Fig. 2 is a side view of the interior of the transmission and clutch housings, with parts broken away;

Fig. 3 is a diagrammatic plan view illustrating one intermediate position of my operative means of connection between the gear-shifting means and the clutch;

Fig. 4 is an enlarged view of the cam mechanism which forms part of my operative means of connection above referred to;

Fig. 5, Fig. 6, Fig. 7, Fig. 8 and Fig. 9 illustrate successive positions following those indicated in Figs. 1 and 3; and Fig. 10 illustrates the intermediate position between that shown in Fig. 9 and that shown in Fig. 1.

In the accompanying drawings there will be recognized a conventional type of transmission with the gear-shift rods 1 and 2 which are adapted to be moved forwardly and rearwardly by the gear-shift lever 3 upon engagement of the same with one or the other of the rods, according to the gear ratio desired at any given time. The rods 1 and 2 are here made flat or of some other suitable form to ensure against the turning of the same, this being for a purpose to be later explained.

Forward movement of rod 2 will establish low gear by shifting gear 4 into mesh with gear 5, while rearward movement of rod 2 will establish reverse gear by shifting gear 4 into mesh with intermediate gear 6 meshing with gear 7. Forward movement of rod 1 will establish high gear by shifting gear 8 into engagement with gear 9, while rearward movement of rod 1 will establish intermediate gear by shifting gear 8 into mesh with gear 10.

It will be understood, of course, in the accompanying illustration, that the gear 9 is mounted for free rotation about the shaft 12, this gear meshes with gear 11 and is operated through the clutch from the engine; gears 4 and 8 are splined upon shaft 12; and gears 5, 7, 10 and 11 are carried by a stub shaft.

This brief explanation will no doubt suffice for a full understanding of the type and operation of transmission herein illustrated and referred to. In fact, the transmission here shown is exactly the same as the well-known conventional type except that in the present case I have provided a double width neutral space for the gears 4 and 8, as will be later more fully explained.

Coming now to the present invention, I have mounted a ring 13 upon ball bearings 13ª on a suitable support within the transmission housing, this ring being mounted in a horizontal plane below the rods 1 and 2. In the present instance, this ring is shown as being substantially concentric with respect to the mounting of the gear-shift lever, although this is not necessary.

The ring 13 carries the four rollers 14, 14ª, 14ᵇ and 14ᶜ which are adapted for engagement by the cams 15, 15ª, 15ᵇ and 15ᶜ provided upon the sides of rods 1 and 2. The purpose of these cams and rollers, in a word, is to effect a turning movement of ring 13 by manipulation of gear-shift rods 1 and 2, this movement of the ring 13 being transferred through the lever connection 16 to the clutch arm 17 on clutch shaft 18, a friction type of clutch being indicated in a general way by reference numeral 19.

It will be understood that spring 20 normally holds the clutch in engaged position and that the clutch is disengaged by clock-wise movement of the arm 17, as viewed in the drawing, so as to cause the auxiliary arm 21 on shaft 18 to engage a projection on the clutch member.

It is to be noted that the movement of ring 13, as caused by the cam and roller mechanism, is always in the same direction, clock-wise as here illustrated, the cams and rollers being so arranged as to function in this manner. As indicated, these cams are similarly arranged upon opposite sides of each gear-shift rod. The force of the clutch spring will serve to return the ring 13 to its original position, and the ring 13 will always resume neutral position in accordance with the movement of the rods 1 and 2.

Any necessary play may be provided in the connections at the two ends of the lever 16 and, if so desired, there may be suitable means of adjustment between the lever 16 and the clutch arm 17.

It is to be noted that the yoke members 4ª and 8ª of the gears 4 and 8, respectively, are not fixedly mounted upon their rods 1 and 2, but they are freely mounted upon reduced portions 1ª and 2ª of these rods for the purpose of allowing a limited longitudinal play between the movement of the gear-shift lever and the gear 4 or gear 8, as the case may be.

The socket provided in each rod to receive the end of the gear-shift lever, is at a fixed point thereupon, the extent of relative movement between the yoke 4ª or 8ª and its rod, being determined by the engagement of the yoke on the one side by the shoulder on the rod and on the other side by the end of the socket.

In Figs. 1 and 2, the gears 4 and 8 are shown in neutral position, these gears being provided with detent means 4ᵇ and 8ᵇ of any suitable character for maintaining these gears in such position but permitting the same to be manipulated in the manner explained.

The purpose of the play or relative movement between the rod and its yoke and gear, in each case, is to permit actuation of the clutch-operating means prior to shifting of the gears and thereby permit meshing engagement of the gears. There will, of course, be the same initial play to ensure opening of the clutch prior to disengagement of the gears. This will be now more fully explained.

When the gear-shift lever, initially occupying neutral position, is engaged in the socket of rod 2, in the regular manner, and the lever moved forwardly, the rod 2 will be moved rearwardly, as usual; but at first the rod 2 moves the gear 4 only to the left part of the enlarged neutral space herein provided, and the cam 15 engages its roller 14 so as to turn ring 13 clock-wise, as viewed in Fig. 3 of the drawings. This initial movement brings the roller to about the middle of its cam and opens the clutch through the operative connections already described. Further movement of rod 2 causes the gear 4 to mesh with gear 6 so as to complete the gear-shift and to establish the "Reverse" gear combination, as indicated in Fig. 5. When this gear combination shall have been fully effected, the roller 14 will have come to the end of its cam 15 and the clutch will thus be closed, as also indicated in this figure of the drawing.

Then upon initiation of the shifting from "Reverse", the movement of rod 2 towards the right, as viewed in the drawings, will first cause the clutch to open by means of the cam 15 and roller 14 prior to movement of the gear, as indicated in Fig. 6, by virtue of the space 2ª, in which position the roller occupies position about in the middle of the cam.

In the next stage of movement from "Reverse", as indicated in Fig. 7, the gear has been shifted to the left part of the space and at the same time the roller 14 and cam 15 return to idle position, thereby permitting the clutch to close. Then by continuing such movement of the rod 2, the gear will be moved from the left part of the enlarged neutral space to the right part thereof, as viewed in the drawings, this continued movement of rod 2 causing the cam 15ª to engage roller 14ª so as to open the clutch, as indicated in Fig. 8. Further movement of rod 2 will cause the gear 4 to mesh with the gear 5 for "Low" gear ratio, the roller and cam now resuming idle position so that the clutch is fully closed when the gears shall have been fully meshed, this position being indicated in Fig. 9.

In Fig. 10 there is indicated the position through which the rod 2 is moved in returning the parts to the original position in Fig. 1. In Fig. 10 the space 2ª has been merely taken up, the clutch being temporarily opened, and further movement will cause the gear 4 to be returned to neutral position indicated in Fig. 1 with the clutch closed.

The above explanation of the shifting to "Reverse" and back to "Neutral" and then to "Low" will not doubt suffice for a full and clear understanding, as the device is manipulated in the same manner for shifting to "Second" or "Intermediate" and "High".

By preventing the rods 1 and 2 from turning, as above referred to, their cams will always be maintained in proper position for engagement with the rollers.

It is to be understood that there may be adopted different designs and relative proportions of the parts which are embodied in my invention, especially with respect to the cams, gears and yokes, and the play provided by the reduced portion of the rods 1 and 2 in conjunction with the relative movability of some of the parts.

In Figs. 3, 5, 6, 7, 8 and 9, the positions are marked "Neutral", "Reverse", etc. so as to indicate the condition of the gears during the progressive stages in the process of shifting, and likewise the condition of the clutch is indicated as "Open" or "Closed" during the successive stages of the gear-shifting operation. It is understood, of course, that when the gear-shifting operation is once initiated, in any case, this operation is carried out without interruption as in the shifting of gears in the conventional transmission. The above description refers to the several intermediate positions merely for the purpose of a clearer understanding.

With my provision of play at the points 1a and 2a and the double neutral space, as indicated in Fig. 2, it is possible for the clutch to occupy closed position whenever the gears are in neutral position; and the clutch will always be fully opened before the gears are engaged or disengaged.

It will be observed that the ring 13 is always moved in the same direction, as indicated by the arrow in Figs. 3 and 6, 8 and 10, for opening the clutch. The spring of the clutch will cause the ring 13 to turn in the opposite direction, as the clutch closes.

The link 16 is connected tangentially to the ring 13 upon the one side thereof, and if so desired, this means of connection may be modified.

As above stated, my invention makes it possible to eliminate the clutch pedal and the accompanying annoyance of manipulating the same. With this invention, the operation of the clutch is automatically effected in conjunction with the shifting of the gears upon manipulation of the gear-shift lever in the regular manner. Furthermore, this advantage has been accomplished by means of a comparatively simple and economical form of device.

Any and all modifications that might be suggested by the present disclosure of invention and that come within the spirit thereof are intended to be comprehended by the following claims, it being understood that the present form of disclosure is merely for the purpose of illustration.

What I claim is:

1. In an automotive device, the combination of a transmission having a gear-shift means including reciprocatable rods for changing the gear ratio, a clutch for establishing drive connection between the engine and the transmission, and operative means of connection between the clutch and the gear-shift means for effecting engagement and disengagement of the clutch by manipulation of the gear-shift means, said operative means including a rotatably adjustable ring, means actuated by said gear-shift rods for manipulating said ring in the same direction at all times for disengaging the clutch, and means for transmitting the movement of said ring to the clutch, thereby eliminating the necessity of a clutch pedal.

2. In an automotive device, the combination of a transmission having a gear-shift means for changing the gear ratio, a clutch for establishing drive connection between the engine and the transmission, and operative means of connection between the clutch and the gear-shift means for effecting engagement and disengagement of the clutch by manipulation of the gear-shift means, said operative means including a rotatably adjustable ring, cam means arranged between said gear-shift means and said ring and actuated by said gear-shift means for manipulating said ring, and means for transmitting the movement of said ring to the clutch, thereby eliminating the necessity of a clutch pedal.

3. In an automotive device, the combination of a transmission having a gear-shift means for changing the gear ratio, a clutch for establishing drive connection between the engine and the transmission, and operative means of connection between the clutch and gear-shift means for effecting engagement and disengagement of the clutch by manipulation of the gear-shift means, said operative means including a rotatably adjustable ring, means actuated by the gear-shift means for manipulating said ring in the same direction at all times for disengaging the clutch, and means for transmitting the movement of said ring to the clutch, thereby eliminating the necessity of a clutch pedal.

4. In an automotive device, the combination of a transmission having a gear-shift means for changing the gear ratio, a clutch for establishing drive connection between the engine and the transmission, and operative means of connection between the clutch and the gear-shift means for effecting engagement and disengagement of the clutch by manipulation of the gear-shift means for all gear ratios, said operative means including a rotatably adjustable ring, means controlled by the forward and backward movements of said gear-shift means for manipulating said ring forth and back in the same manner at all times for disengagement and engagement of the clutch, and means for transmitting the movement of said ring to the clutch, thereby eliminating the necessity of a clutch pedal.

5. In an automotive device, the combination of a transmission having a gear-shift lever for changing the gear ratio, a clutch for establishing drive connection between the engine and the transmission, and operative means of connection between the clutch and the gear-shift lever for effecting engagement and disengagement of the clutch by manipulation of the gear-shift lever, said operative means including a rotatably adjustable ring mounted in a horizontal plane and around the mounting of the gear-shift lever, cam mechanism provided upon the gear-shift rods of the transmission and upon the ring for operating the ring by manipulation of the gear-shift lever, and means for transmitting the movement of the ring to the clutch, thereby eliminating the necessity of a clutch pedal.

6. In an automotive device, the combination of a transmission having a gear-shift lever for changing the gear ratio, a clutch for establishing drive connection between the engine and the transmission, and operative means of connection between the clutch and the gear-shift lever for effecting engagement and disengagement of the clutch by manipulation of the gear-shift lever, said operative means including means of relative movement between the gear-shift rods of the transmission and the gears, and means actuated by movement of said gear-shift rods for said clutch manipulation, whereby the clutch can be manipulated without the necessity of a clutch pedal.

7. In an automotive device, the combination of a transmission having a gear-shift lever for changing the gear ratio, a clutch for establishing drive connection between the engine and the transmission, and operative means of connection between the clutch and the gear-shift lever for effecting engagement and disengagement of the clutch by manipulation of the gear-shift lever, said operative means including a rotatably adjustable ring, co-operative means provided upon the gear-shift rods of the transmission and upon the ring for operating the ring by manipulation of the gear-shift lever, said gear-shift rods having means of relative longitudinal movement with respect to the gears to be shifted thereby so as to permit opening of the clutch prior to engagement or disengagement of the gears, whereby the clutch can be manipulated without the necessity of a clutch pedal.

8. In an automotive device, the combination of a transmission having a gear-shift lever for changing the gear ratio, a clutch mechanism for establishing drive connection between the engine and the transmission, and operative means of connection between the clutch and the gear-shift lever for effecting engagement and disengagement of the clutch by manipulation of the gear-shift lever, said operative means including a rotatably adjustable ring, cams provided upon opposite sides of each gear-shift rod of the transmission, and rollers provided upon the ring for engagement by said cams, operative means of connection between said ring and the clutch mechanism, said gear-shift rods having means of relative longitudinal movement with respect to the gears to be shifted thereby so as to permit opening of the clutch prior to engagement or disengagement of the gears, whereby the clutch can be manipulated without the necessity of a clutch pedal.

9. In an automotive device, the combination of a transmission having an enlarged neutral space for the shifting of the gears and means including a lever for shifting the same so as to vary the gear ratio, a clutch for establishing drive connection between the engine and the transmission, and a single operative means of mechanical connection between the clutch and the gear-shift lever for effecting manipulation of the clutch by the manipulation of the gear-shift lever, thereby eliminating the necessity of a clutch pedal, said gear-shifting means being provided with play relative to the gears, and there being a co-operative relation between said play and said enlarged neutral space so as to permit opening of the clutch prior to manipulation of the gears.

10. In an automotive device, the combination of a transmission having a double neutral space for the shifting of the gears and means including a lever for shifting the same so as to vary the gear ratio, a clutch for establishing drive connection between the engine and the transmission, and a single operative means of mechanical connection between the clutch and the gear-shift lever for effecting manipulation of the clutch by the manipulation of the gear-shift lever, thereby eliminating the necessity of a clutch pedal, said gear-shifting means being provided with play relative to the gears, and there being a co-operative relation between said play and said enlarged neutral space so as to permit opening of the clutch prior to manipulation of the gears.

11. In an automotive device, the combination of a transmission having a double neutral space for the shifting of the gears and means including rods and a lever for shifting the same so as to vary the gear ratio, a clutch mechanism for establishing drive connection between the engine and the transmission, and operative means of connection between the clutch and the gear-shift lever for effecting engagement and disengagement of the clutch by manipulation of the gear-shift lever, said operative means including a rotatably adjustable ring, cams provided upon opposite sides of each gear-shift rod of the transmission, and rollers provided upon the ring for engagement by the cams, operative means of connection between said ring and the clutch mechanism, said gear-shift rods having means of relative longitudinal movement with respect to the gears to be shifted thereby and having co-operative relation with respect to said double neutral space so as to permit opening of the clutch prior to engagement and disengagement of the gears, whereby the clutch can be manipulated without the necessity of a clutch pedal.

GEORGE EATON.